United States Patent [19]

Beller et al.

[11] Patent Number: 5,299,263
[45] Date of Patent: Mar. 29, 1994

[54] TWO-WAY PUBLIC KEY AUTHENTICATION AND KEY AGREEMENT FOR LOW-COST TERMINALS

[75] Inventors: Michael J. Beller, Red Bank; Yacov Yacobi, Berkeley Heights, both of N.J.

[73] Assignee: Bell Communications Research, Inc., Livingston, N.J.

[21] Appl. No.: 26,673

[22] Filed: Mar. 4, 1993

[51] Int. Cl.$^5$ .......................... H04L 9/30; H04L 9/08
[52] U.S. Cl. ........................................ 380/30; 380/21; 380/23; 380/29; 380/49; 379/95; 340/825.31; 340/825.34
[58] Field of Search ................. 380/23, 25, 30, 49, 380/21, 24, 43, 29; 340/825.31, 825.34; 235/380; 379/95

[56] References Cited

U.S. PATENT DOCUMENTS

| | | | |
|---|---|---|---|
| 4,453,074 | 6/1984 | Weinstein | 235/380 |
| 4,723,284 | 2/1988 | Munck et al. | 380/25 |
| 4,799,258 | 1/1989 | Davies | 380/21 |
| 4,876,716 | 10/1989 | Okamoto | 380/21 |
| 4,935,962 | 6/1990 | Austin | 380/25 |
| 4,969,189 | 11/1990 | Ohta et al. | 380/25 |

OTHER PUBLICATIONS

National Bureau of Standards, *Data Encryption Standard*, FIPS-PUB-46, 1977.
A. Shimizu et al., *FEAL-Fast Data Encipherment Algorithm*, Systems and Computers in Japan, vol. 19, No. 7, pp. 20-34, 1988.
S. Miyaguchi, *The FEAL Cipher Family*, Proceedings of CRYPTO '90, Santa Barbara, Calif., Aug. 1990.
R. C. Rivest et al., *A Method for Obtaining Digital Signatures and Public-Key Cryptosystems*, Communications of the ACM, vol. 21, No. 2, pp. 120-126, Feb. 1978.
T. Elgamal, *A Public Key Cryptosystem and a Signature Scheme Based on Discrete Logarithms*, IEEE Trans. on Info. Theory, vol. IT-31, No. 4, pp. 469-472, Jul. 1985.
M. O. Rabin, *Digitalized Signatures and Public Key Functions as Intractable as Factorization*, MIT Laboratory for Computer Science, TR 212, Jan. 1979.
S. Goldwasser et al., *A Digital Signature Scheme Secured Against Adaptive Chosen-Message Attacks*, SIAM J. COMPUT., vol. 17, No. 2, pp. 281-308, Apr. 1988.
N. Koblitz, *A Course in Number Theory and Cryptography*, Springer Verlag, p. 32, 1987.
S. Even et al. *On-Line/Off-Line Digital Signatures*, in Advances in Cryptology-CRYPTO '89 Proceedings, G. Brassard (ed.), Lecture Notes in Computer Science, vol. 435, Springer-Verlag, pp. 263-275, 1990.
C. P. Schnorr, *Efficient Signature Generation by Smart Cards*, Journal of Cryptology, vol. 4, No. 3, pp. 161-174, Mar. 1991.
A. Shamir, *An Efficient Identification Scheme Based on Permuted Kernels*, Proceedings of CRYPTO '89, G. Brassard, Ed., LNCS 435, pp. 606-609, Apr. 1989.
A. Fiat et al., *How to Prove Yourself: Practical Solutions to Identification and Signature Problems*, Proceedings of CRYPTO '86, A. M. Odlyzko, Ed., LNCS 263, pp. 186-194, 1987.

*Primary Examiner*—Bernarr E. Gregory
*Attorney, Agent, or Firm*—Leonard Charles Suchyta; Loria B. Yeadon

[57] ABSTRACT

A method for achieving mutual authentication and session key agreement between a first party 12 which has minimal computational resources and a second party 18 which has substantial computational resources utilizes a modular square root operation for certificate authentication and key distribution and an ElGamal, NIST DSS, or other efficient signature operation for obtaining the signature of a message. These operations are highly advantageous in a system with asymmetric resources because the computation power required to perform these operations is far less than the computation power required to invert these operations. The entire mutual authentication and session key agreement method can be carried out using only three modular multiplications on the weak computational side.

37 Claims, 2 Drawing Sheets

TWO-WAY PUBLIC KEY AUTHENTICATION AND KEY AGREEMENT FOR LOW-COST TERMINALS

RELATED APPLICATION

A patent application entitled "Cryptographic Method for User Authentication and Key Agreement" has been filed for M. J. Beller, L. F. Chang, and Y. Yacobi on Nov. 8, 1991, bears Ser. No. 789,700 now U.S. Pat. No. 5,222,140, issued Jun. 22, 1993 and is assigned to the assignee hereof. The above-identified application contains subject matter related to the subject matter of the present application and is incorporated herein by reference.

FIELD OF THE INVENTION

The present invention relates to a method for achieving mutual authentication and session key agreement between a pair of parties using public key cryptography. In particular, the present invention is applicable to a system wherein one of the parties is computationally weak, i.e., has a minimum of computational capability, and one of the parties is computationally strong, i.e., has a much larger computational capability. In a preferred embodiment of the present invention, complete authentication and session key agreement is achieved between two parties without the exchange of any permanent secrets through the use of only three real-time large modular multiplications performed at the computationally weak party. In contrast, prior art methods for achieving mutual authentication and session key agreement with the same level of security require on the order of 200 real-time large modular multiplications at the computationally weak party.

BACKGROUND OF THE INVENTION

In a portable communication system, users carry low power, low cost, portable digital radio telephone terminals from place to place during and between calls.

Some portable terminals employ a Digital Signal Processor to implement the complicated algorithms that are needed to code speech at low bit rate. Other portable terminals utilize a custom chip for the low bit rate encoding of speech and include a low power microcontroller for handling signalling protocols and other miscellaneous tasks. In either case, a portable terminal must operate for long periods of time on small batteries and a low power implementation of all signal processing operations inside the portable terminal is important. Accordingly, there is a limit on the complexity of any signal processing operation which can take place inside the portable terminal in a short period of time.

In a portable communication system, the portable radio terminals access the local telephone exchange network via a suitably dense matrix of shoebox sized radio ports which are located on utility poles or in buildings. Each port comprises a radio modem. Each port is in turn connected back to the telephone network switching system by way of a server in the form of a port control unit which may be located in a central office building. A port control unit performs a variety of processing functions including converting between a format suitable for use on the radio link between the portable terminal and the radio ports and a format suitable for use in the telephone network switching system.

The portable communication system may be described as being computationally asymmetric. By this it is meant that each connection has a computationally weak party in the form of the terminal—i.e., a party with small computational resources—and a computationally strong party in the form of the server—i.e., a party with large computational resources. Thus algorithms which are used in such an asymmetric system should preferably be computationally asymmetric, i.e., the algorithm should require only a minimum of processing on the computationally weak side while more substantial processing is performed on the computationally strong side.

Because a portable communication system transmits conversations between portable telephone terminals and an array of fixed location ports via radio, the conversations of a portable communication system are more susceptible to eavesdropping than are the conversations of a wireline network.

In addition, unlike wireline telephones, which are tied to a particular wire pair on a particular network, portable telephone terminals roam from place to place and access the network via different ports at different times. The lack of association between user and particular physical location can make a portable communication system vulnerable to attempts at the fraudulent acquisition of services.

The present invention is particularly concerned with message encryption (i.e., the encryption of conversation content), key agreement and distribution (i.e. distribution of the keys required by message encryption techniques) and authentication (i.e. ensuring that a service request is legitimate). In particular, the present invention is concerned with foiling the eavesdropper, i.e., one who utilizes radio equipment to intercept the radio transmissions between the portable terminals and the ports.

Another problem which characterizes portable communication systems is the problem of user traceability. Specifically, if a user transmits identifying information in the clear, it is possible for an eavesdropper to determine the location of the user, so that privacy with respect to a user's location is not maintained. The present invention also relates to maintaining the privacy of a user location.

Eavesdropping can be thwarted through the use of a message encryption technique. A message encryption technique employs an encipherment function which utilizes a number referred to as a session key to encipher data (e.g., conversation content). Only the portable terminal and the specific port control unit with which the portable terminal is in communication should have knowledge of the session key, so that only the proper portable terminal and the port control unit, as paired on a particular conversation, can encrypt and decrypt digital signals. Two examples of encipherment functions are the National Bureau of Standards Data Encryption Standard (DES) (see e.g., National Bureau of Standards, "Data Encryption Standard", FIPS-PUB-45, 1977) and the more recent Fast Encipherment Algorithm (FEAL) (see e.g., . Shimizu and S. Miyaguchi, "FEAL-Fast Data Encipherment Algorithm," Systems and Computers in Japan, Vol. 19, No. 7, 1988 and S. Miyaguchi, "The FEAL Cipher Family", Proceedings of CRYPTO '90, Santa Barbara, Calif., August, 1990). One way to use an encipherment function is the electronic codebook technique. In this technique a plain text message m is encrypted to produce the cipher text message c using the encipherment function f by the formula $c = f(m,sk)$ where sk is a session key. The cipher text message c can only be decrypted with the knowledge of the session key sk to obtain the plain text message $m = f^{-1}(c,sk)$.

One problem with the use of the encipherment functions such as DES and FEAL in a portable communication system is the problem of session key agreement.

In the conventional session key agreement technique, each portable terminal i has a secret key $k_i$ known only to it and a cryptographic database DB. Similarly, each port control unit j has a secret key $k_j$, known only to it and the cryptographic database DB. At the start of a communication session, the portable terminal i sends a service request and its identity i in the clear to a port control unit j. The port control unit sends the pair (i,j) to the cryptographic database DB. The DB picks a random session key sk and sends to the port control unit j the pair $c_i,c_j$ where $c_i = f(k_i,sk)$ and $c_j = f(k_j,sk)$. The port control unit j deciphers $c_j$ to find sk and sends $c_i$ to the portable terminal i. The portable terminal i deciphers $c_i$ to find sk. Now both the port control unit j and the portable terminal i are in possession of the session key sk. Thus, enciphered messages $c = (m,sk)$ can be transmitted back and forth between the portable terminal i and the port control unit j.

This approach has several advantages. First the approach requires minimal power in the portable terminal because it utilizes only conventional cryptography. In particular, the computation power required to evaluate f and $f^{-1}$ is quite small.

In addition, the conventional key distribution approach is also self-authenticating because a portable telephone trying to impersonate the portable telephone i must know the ostensibly secret key $k_i$ ahead of time.

On the other hand, the conventional key distribution protocol requires a database of secret cryptographic keys, which is hard to protect and maintain, and adds survivability and reliability problems to the system. A primary weakness is that a potential eavesdropper can obtain the key $k_i$ for the portable telephone i once, and can subsequently intercept all of i's conversations without i knowing about it. This is the worst kind of damage that can occur; undetectable compromise of privacy. Also, the conventional key distribution protocol has a traceability problem. A portable terminal must announce its identity in the clear before a session key can be fetched from the database. Thus, an eavesdropper can determine the location of a particular portable.

Another approach to session key distribution and party authentication in a portable communication system is to use public key cryptographic techniques. In a typical public key cryptographic system, each party i has a public key $P_i$ and a secret key $S_i$. The public key $P_i$ is known to everyone, but the secret key $S_i$ is known only to party i. A message m to user i is encrypted using a public operation which makes use of the public key known to everyone, i.e., $c = P(m,P_i)$ where c is the encrypted message, m is the clear text message, $P_i$ is the public key and P signifies the public operation. However, this message is decrypted using an operation which makes use of the secret key $S_i$, i.e., $m = S(c,S_i)$ where s signifies the operation. Only the party i which has the secret key $S_i$ can perform the operation to decrypt the encrypted message.

Public key cryptographic techniques can be used for the distribution of session keys to the parties in a portable communication system. (See the above-identified U.S. patent application, Ser. No. 789,700). Public key cryptographic techniques can also be used for party authentication in a portable communication system.

One way to use public key cryptography for authentication is to use a signature system. If it is true that $P(S(m,S_i),P_i) = m$, then the owner of the corresponding keys $P_i$, $S_i$, could sign message m by producing $c = S(m,S_i)$. The verifier, given m and c will verify $m = P(c,P_i)$. A signature system could be used for verification as follows: If it is well known that party i's public key is $P_i$ and some party claims to be i, challenge the party claiming to be i with message m and ask the party to sign the message m using his secret key $S_i$, then verify the signature using $P_i$.

Another aspect of party authentication relates to authentication of a party's public key $P_i$. A user claiming to be i can provide his public key provided it is certified by a trusted central authority such as a network administrator. The trusted central authority itself has a well known public key $P_u$. The certification is a signature of the trusted authority on a linkage between the user's identification i and his public key $P_i$.

The highest level of security for session key distribution, and mutual party authentication based on public key cryptography:
1) avoids the use of an on-line centralized database of secret information,
2) hides the identity of a user from an eavesdropper
3) achieves mutual authentication and session key agreement between the parties, in such a way that they do not exchange any permanent secrets.

To achieve this highest level of security using RSA, the most well-known public key algorithm (see e.g., R. L. Rivest, A. Shamir, L. Adleman, "A Method for Obtaining Digital Signatures and Public-Key Cryptosystems", Communications of the ACM, vol. 21, no. 2, pp. 120–126, February 1978), each of the parties must perform on the order of 200 large modular multiplications (where the numbers involved are over 500 bits in length). Using the algorithms described in the above-identified U.S. patent application Ser. No. 789,700, this highest level of security requires about 200 modular multiplications.

The problem with these prior art algorithms is that a large amount of computations is required by both parties. This is not suitable in an asymmetric system wherein one side (e.g., the terminal or portable telephone) has only weak computational resources and one side (e.g., the server or port control unit), has strong computational resources. The prior art algorithms are not sufficiently asymmetric so that only a very small amount of computations need to be performed on the weak side.

Accordingly, it is an object of the present invention to provide a public key cryptographic method for key distribution and mutual party authentication with a high level of security in an asymmetric system where one of the parties is computationally weak and the other party is computationally strong.

SUMMARY OF THE INVENTION

The present invention is directed to a method for achieving mutual authentication and session key distribution for a communication session between two parties where the first party is computationally weak, i.e., has limited computational resources, and the second party is computationally strong, i.e., has substantial computational resources. For example, the first party may be a terminal in the form of a portable telephone and the second party may be a server in the form of a port control unit in a wireless personal communication system.

In accordance with the invention, two highly asymmetric public key cryptographic operations are utilized. A modular square root operation is used for certificate authentication and session key distribution. An ElGamal signature operation (see, e.g., T. ElGamal, "A Public Key Cryptosystem and a Signature Scheme Based on Discrete Logarithms", IEEE Trans. IT, Vol. IT-31, No. 4, July 1985, pp. 469–472) is used to obtain and verify the signature of the computationally weak party. When these operations are used the entire mutual authentication and session key distribution method requires only three real-time modular multiplications at the computationally weak party. The modular square root and ElGamal operations are extremely well suited for the asymmetrical system described above. They utilize encryption operations which require little real-time computation power and which can be performed at the computationally weak side portion, while the inverse decryption operations which require significant computational power can be performed at the computationally strong side party.

In accordance with a preferred embodiment of the inventive method, in a first phase, a public key of the server (computationally strong side) as well as a certificate of the server is transmitted to the terminal (computationally weak side). The certificate of the server is verified. A random number $x=(x_L,x_R)$ where $(x_L,x_R)$ signifies the concatenation of two numbers $x_L$ and $x_R$ is chosen at the terminal and encrypted by squaring x using the public key of the server as a modulus (see, e.g., M. O. Rabin, "Digitalized Signatures and Public Key Functions as Intractable as Factorization", MIT Laboratory for Computer Science, TR 212, January 1979). The result is transmitted to the server which inverts the squaring operation using its secret key. Thus, both sides are in possession of x. Thus, x or $x_L$ or $x_R$ may be used as the session key. The number $x_L$ or $x_R$ may be transmitted back from the server to the terminal to verify that the server was in fact able to obtain x. In a later phase, a public key of the terminal and a certificate of the terminal are sent to server encrypted conventionally using the session key. The terminal certificate is verified at the server. An ElGamal signature of a challenge from the network is computed at the terminal, is encrypted conventionally using the session key, and is transmitted to the server. The ElGamal signature operation is inverted at the server using the previously transmitted public key of the terminal to verify the signature. In an alternative embodiment, the National Institute of Standards in Technology (NIST) Digital Signature Standard (DSS) algorithm can be used as the signature scheme instead of using an ElGamal scheme. In further alternative embodiments, any signature system which is efficient for the signer could be used in place of the ElGamal scheme. For example, the following systems may be used: Even Goldreich and Micali (S. Even, O. Goldreich, S. Micali, "On-Line/Off-Line Digital Signature Schemes", in "Advances in Cryptology-CRYPTO '89 Proceedings," G. Brassard (ed.), Lecture Notes in Computer Science, Vol. 435, Springer-Verlag, 1990,pp. 263–275.), Schnorr (C. P. Schnorr, "Efficient Signature Generation by Smart Cards", "Journal of Cryptology, Vol. 4, No. 3, 1991, pp 161–174), Shamir (A. Shamir, "An Efficient Identification Scheme Based on Permuted Kernels-Extended Abstract", Proceedings of CRYPTO '89, G. Brassard, Ed., LNCS 435,pp. 606–609), or Fiat and Shamir (A. Fiat, A. Shamir, "How to Prove Yourself: Practical Solutions to Identification and Signature Problems", Proceedings of CRYPTO '86, A. M. Odlyzko, Ed., LNCS 263, 1987, pp. 186–194).

In addition to requiring very little computational resources at the weak side party, the inventive method has some other significant advantages. The individual building blocks of the inventive method (modular square root and ElGamal signature in the preferred) are made inseparable by using the session key obtained in the first phase to encrypt transmissions in the second phase, thereby protecting against the possibility of "cut in the middle" attacks. In addition, in a wireless personal communication system, the inventive method provides security against eavesdroppers and provides privacy of the user's location. No permanent secrets of an individual user are disclosed to the network and no secret information is stored in a vulnerable on-line database.

The invention has mainly been described in connection with a portable communication system and specifically a portable communication system wherein the portable terminals are portable telephones. However, it should be noted that the portable terminals may also be portable computers or portable fax machines or other devices which transmit data to and receive data from a port control unit of a portable communication system.

In general, the invention is applicable to any system wherein a terminal and a server communicate with one another in an environment where there is a need for session key distribution for encryption and mutual party authentication. The invention is applicable especially where the computational resources of the terminal are much smaller than the computational resources of the server. For example, the terminal (i.e., weak side party) may be a smart card and the server (strong side party) may be a smart card base unit. Alternatively, the terminal may be an Analog Display Services Interface (ADSI) terminal used for home banking, for example, and the server may be an ADSI cryptoserver. Another application could be a computer client/server system, where many client computers access a single server. It is possible that such clients and servers will have comparable computing power. In this case it may be advantageous to perform the "weak side" computations in the server to balance the computational load.

DETAILED DESCRIPTION OF THE INVENTION

The detailed description of the invention is divided into the following sections. Section A describes a portable communication system. Section B describes the Rabin modular square root public key operation. Section C describes ElGamal signature operation. Section D describes public key certificates. Section E describes an illustrative session key distribution and mutual authentication protocol in accordance with an embodiment of the invention.

A. PORTABLE COMMUNICATION SYSTEM

Figure 1:
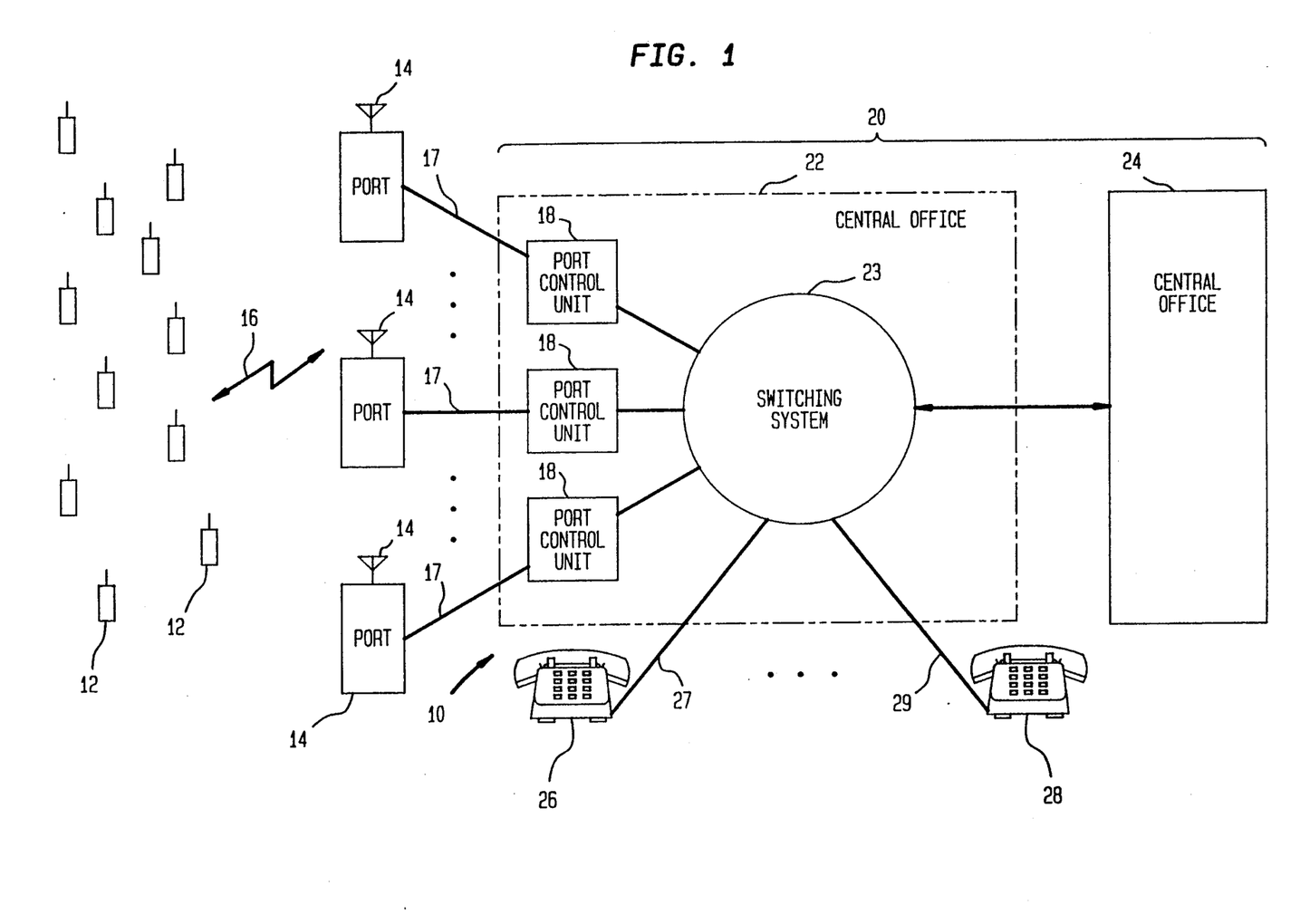
FIG. 1 schematically illustrates a portable communication system.

A portable communication system 10 is schematically illustrated in FIG. 1. The system 10 comprises a plurality of low power, low cost portable digital radio terminals 12. The portable terminals 12 are carried from place to place by their users. Illustratively, the terminals 12 are portable telephones.

The portable terminals 12 communicate with the local exchange telephone system 20. The local exchange telephone system 20 is represented in FIG. 1 by the central office 22, the central office 24, and the customer premises equipment 26 and 28 connected by wire lines 27 and 29, respectively, to the central office 22.

As indicated above, some portable telephones employ a Digital Signal Processor (DSP) to implement the complicated algorithms that are needed to code speech at low bit rates. Other portable telephones utilize a custom chip for the low bit rate coding of speech and include a low power general purpose microcontroller for handling signalling protocols and other miscellaneous tasks. In any case, a portable telephone or other portable terminal must operate for long periods of time on small batteries and low power implementation of all signal processing operations inside the portable terminal is important.

The portable terminals 12 access the local exchange telephone system 20 via the ports 14. A specific portable terminal 12 and a specific port 14 communicate via a radio link, schematically illustrated in FIG. 1 by the arrow 16. The ports 14 are typically of shoebox size and are located on utility poles or buildings. Each of the ports 14 comprises a simple radio modem.

The ports 14 connect back to the local exchange telephone system 20 via the lines 17 and the servers or port control units 18. The port control units 18 are generally located in a central office building and perform a variety of signal processing functions. Specifically, a port control unit 18 translates between a format suitable for transmission via the radio link 16 and a format suitable for use in the switching system 23 of the central office 22. Each port control unit 18 also does speech transcoding and performs signal processing necessary for encryption and decryption of messages over the radio link 16.

B. RABIN MODULAR SQUARE ROOT OPERATION

Let p and q be two secret primes, and N=pq. Each user has a pair of secret and public keys, where the public key is a composite number, such as the above N, and the secret is its factorization p and q. To encrypt a message x, intended for the owner of the above keys, one computes $$y \equiv x^2 \bmod N \tag{1}$$

i.e., just one large multiplication. It has been proven that computing x given y and N is as hard as factoring N and is therefore a difficult task unless the secret prime numbers P and q are known.

Given y, p and q it is easy to find x (at a cost equivalent to about 200 large multiplications). Specifically, primes p and q are used such that $p \equiv q \equiv 3 \bmod 4$ to find $x = x_p \bmod p$, and $x = x_q \bmod q$. It is easy to see, using Fermat's little theorem, that if $$x_p \equiv y^{(p+1)/4} \bmod p, \text{ and } x_q \equiv y^{(q+1)/4} \bmod q, \tag{2}$$

then $$x_p^2 \equiv y \bmod p, \tag{3}$$

$$x_q^2 \equiv y \bmod q \tag{4}$$

from which, using Chinese Remaindering, there can be computed $$x \equiv x_p \cdot q \cdot 1_i + x_1 \cdot p \cdot p_i \bmod pq, \tag{5}$$

where $q_i$ and $p_i$ have been chosen so that:

$$q_i \equiv q^{-1} \bmod p, \text{ and } p_i \equiv p^{-1} \bmod q. \tag{6}$$

Note that there is an ambiguity in using this technique for encryption, because if $x_p$ is a solution to (3), then so is $-x_p \bmod p$. Likewise, if $x_q$ is a solution to (4), then so is $-x_q \bmod q$. Thus the congruence (1) usually has four solutions. To resolve this ambiguity, x is chosen by the sender to contain some previously-agreed-upon pattern. The decrypting party then selects this "colored" solution. For example, if x contains all zeroes in the least significant 30 bits, there is roughly a one in a billion probability that the ambiguity will remain, in which case the protocol can simply be aborted and re-executed.

As used herein, the above procedure for solving Eq. (1) for x given y, is denoted as $$x = \sqrt{y} \bmod N \tag{7}$$

This technique can also be used to generate an unforgeable signature. To create a signature on message m, a user with widely-known public key N (which is the product of secret primes p and q), can compute signature s as $$s = \sqrt{m} \bmod N \tag{8}$$

using the secret keys P and q in accordance with the procedure shown above. Any party wishing to verify the signature just checks whether the above congruence is true. This verification requires only a single modular multiplication. On the other hand, it is computationally infeasible to forge a signature because the potential forger must know the secret keys p and q, the factors of N. For this signature scheme no coloring is needed for the signature, however, coloring is needed for the message, to prevent the Rabin "paradox" attack (S. Goldwasser, S. Micali, R. L. Rivest, "A Digital Signature Scheme Secured Against Chosen Message Attacks", SIAM J. On Comput., Vol. 17, No. 2, 1988, pp. 281-308). This attack is feasible whenever the victim is willing to extract modular square roots of any arbitrary integer, and expose the result to the attacker. Also, the victim has to choose one of the possible roots at random, i.e., if the "correct" root is colored, and the victim returns the colored root then the attack will fail. Otherwise, this attack leads to efficient factorization of the victim's modulus. In the inventive protocol this attack is not feasible.

C. ELGAMAL SIGNATURES

Let $P_a$ and $S_a$ be the public and secret keys of user a, where $P_a \equiv a^{S_a} \bmod N_S$. $N_S$, the ElGamal signature modulus is either prime or composed of the product of two primes, and $\alpha$ is a generator in the maximal cyclic subgroup of the multiplicative group of integers modulo $N_S$, $Z^*_{N_S}$ (see, e.g., N. Koblitz, "A Course in Number Theory and Cryptography," Springer Verlag, 1987, p. 32). An ElGamal signature (see, e.g., T. ElGamal, "A Public Key Cryptosystem and a Signature Scheme Based on Discrete Logarithms", IEEE Trans. IT, Vol. IT-31, No. 4, July 1985, pp. 469–472) by user a, on message m is an ordered pair (v,w), for which $$P^v_a \cdot V^w \equiv \alpha^m \bmod N_S \quad (9)$$

Thus a recipient of a signature can easily verify it. To create a signature, user a chooses a random number r, and computes $v \equiv \alpha^r \bmod N$. From (9) it follows that $$S_a \cdot v + r \cdot w \equiv m \bmod \phi(N_S) \quad (10)$$

where $\phi(N)$ is the Euler totient function. It follows that a, who (is the only one who) knows $A_a$, can compute w, provided $\gcd(r,\phi(N))=1$, where gcd means greatest common divisor.

It is believed to be hard for anybody not knowing $S_a$ to forge a signature on a pre-specified message, given certain precautions are taken.

Since $r, v, r^{-1}$ and $S_a \cdot v$ could be prepared ahead of time (they are independent of the message to be signed), the only significant on-line (i.e., real-time) operation is the multiplication by $r^{-1}$ in $$w \equiv (m - S_a v) \cdot r^{-1} \bmod \phi(N_s) \quad (11)$$

It is important to note that the value r, chosen randomly by the signer, must change with every signature. Otherwise the signer's secret $S_a$ can be revealed.

D. PUBLIC KEY CERTIFICATES

Public key certificates are the signature of a trusted authority on the linkage of an identity and the corresponding claimed public key. There is a Central Authority (CA) with a secret key $p_u$ and $q^u$ and public key $N_u = p_u \cdot q_u$. The Central Authority is an off-line trusted entity. When a terminal (e.g., portable communication unit) or network server (e.g., port control unit) is initialized, it is given a unique identity i, it chooses its own secret key, $p_i$, $q_i$ or $S_i$, and computes the corresponding public key, either $N_i$ in accordance with the Rabin modular square root scheme, or $P_i$ in accordance With the ElGamal scheme.

The CA then provides the terminal or server with its signature on a linkage between i and $N_i$ in the case of a Rabin scheme (or i and $P_i$ in ElGamal). A linkage can be a one-way hashing of the concatenation of the involved items. During a communication session, a terminal with ElGamal public key $P_i$ sends its identity, public key, and certificate to the network server. Once the certificate is verified by the server, a process which requires one squaring modulo $N_u$ and which proves that the CA agreed to the linkage between the identity and public key, the terminal can prove its identity by performing a signature to a random challenge message m using the secret key associated with $P_i$.

Similarly, the server can send its identity, public key, and certificate to the terminal. The terminal can square the certificate modulo $N_u$ to confirm the linkage, and send a message to the server, encrypted with the server's verified public key. The server can prove its identity by performing the secret operation (decryption) associated with the public key.

E. SESSION KEY DISTRIBUTION AND MUTUAL AUTHENTICATION PROTOCOL

Figure 2:
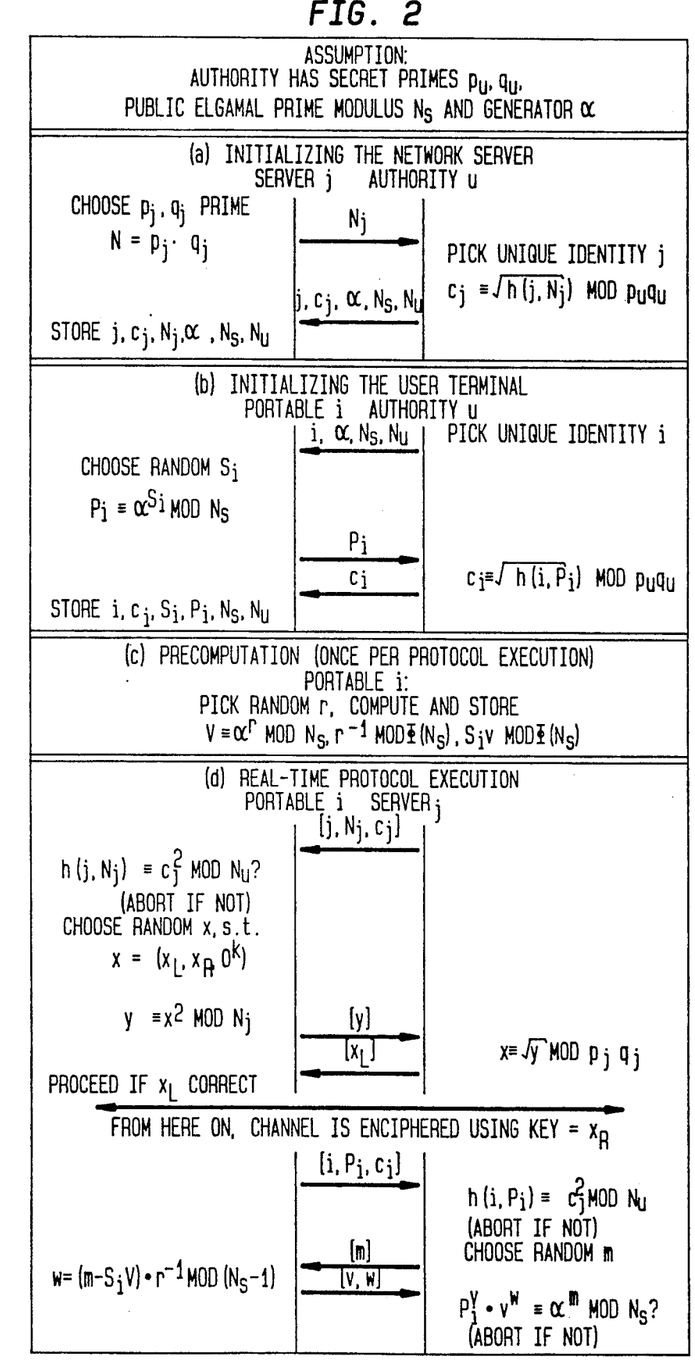
FIG. 2 schematically illustrates a session key distribution and mutual party authentication protocol according to an illustrative embodiment of the present invention.

FIG. 2 illustrates a session key distribution and mutual authentication protocol in accordance with an embodiment of the invention. The protocol may be used at the start of each communication session between a computationally weak terminal (e.g., portable communication unit, ADSI, smart card) and a computationally strong network server (e.g., port control unit ADSI network cryptoserver, smart card base unit).

To use the protocol, the terminal and server are assumed to be initialized. When the server is initialized (part (a) of FIG. 2), it picks a Rabin secret key $p_j,q_j$ and a corresponding public key $N_j = p_j \cdot q_j$. The corresponding public key $N_j$ is transmitted to the central authority u. The central authority picks a unique identity j for the server. The central authority also computes the certification $c_j$ which is illustratively a Rabin signature (i.e., modular square root) on $h(j,N_j)$ where h represents a hashing of a linkage comprised of j and $N_j$, i.e., $c_j \equiv \sqrt{h(j,N_j)} \bmod N_u$, where $N_u = p_u q_u$ is a modulus of the central authority u. The central authority then transmits $j, c_j, \alpha$ (the ElGamal generator), $N_S$ (the ElGamal modulus) and $N_u$ to the server j. The server then stores $j$, $c_j$, $N_j \alpha$, $N_S$, $N_u$.

When a terminal (part (b) of FIG. 2) is initialized, the central authority picks and transmits a unique identity i to the terminal. The central authority also transmits $\alpha$, N. and $N_u$ to the terminal. The terminal i chooses a secret key $S_i$ and generates the associated public key $P_i$ in accordance with the ElGamal operation described above. The public key $P_i$ is transmitted to the central authority u. The central authority u provides the terminal i with a certificate in the form of a Rabin signature (i.e., modular square root) on $h(i,P_i)$, i.e., $c_i \equiv \sqrt{h(i,p_i)} \bmod N_u$. The terminal i also stores $N_u$ the public key of the central authority u and $c_i$, $S_i$, $P_i$, $N_S$ and $N_u$.

Part (c) of FIG. 2 shows the precomputation that is performed once per protocol execution but prior to the actual time of protocol of execution. The precomputation is required for the ElGamal signature operation. To perform the precomputation the terminal i picks a random number r and computes and stores $v = \alpha^r \bmod N_S$, $r^{-1} \bmod \phi(N_s)$, and $S_i v \bmod \phi(N_s)$.

At the start of a communication session as shown in part (d) of FIG. 2, the network server sends its identity j, public key $N_j$, and certificate $c_j$ to the terminal. The terminal verifies the certificate $c_j$ by squaring it modulo the central authority's public key $N_u$. If it is correct, the terminal picks a random number x, considered to be a concatenation of two halves $x_L, x_R$, and "color" (e.g., k leading or trailing zeros as indicated by the symbol $O^k$). The terminal then encrypts x. The encryption involves performing an operation $Y = o(x)$ which preferably involves only a single modular multiplication. For example, $y = o(x) \equiv x^2 \bmod N_j$. The terminal then transmits y to the network server. The network server decrypts y by performing the operation $x = o^{-1}(y) \equiv \sqrt{y} \bmod N_j$, chooses the root with correct "color", and sends $x_L$ back to the terminal to prove it was able to decrypt and is therefore an authentic network server. Note that the Rabin "paradox" attack is infeasible here, because the server does not respond with arbitrary root, but returns the same root that the terminal chose (and, in fact, only a portion, e.g., $x_L$, of that root). The number $x_R$ which is now known exclusively by both the terminal and the server serves as a session key.

From this point on the protocol messages (and ensuing conversation) are encrypted with a conventional cipher function using $x_R$ as the session key in order to hide the identity of the terminal from an eavesdropper on the communication channel between the terminal and server. This is useful especially in a portable telephone, where customer location information should be hidden from an eavesdropper.

The terminal then sends its identity i, public key $P_i$ and certificate $c_i$ to the server. The server Verifies the certificate by squaring modulo the central authority's public key. The server then sends a random challenge to the terminal in the form of message m. The terminal proves its identity by returning an ElGamal signature on the random challenge. The signature requires only one real-time modular multiplication in the terminal if the above-specified "pre-computations" are performed ahead of time. The server then verifies the signature.

A variation on this protocol is for each terminal to have its own public ElGamal modulus $N_{iS}$ with secret prime factors $p_{iS}$ and $q_{iS}$ known only to terminals. In this case, $N_{iS}$ has to be transmitted to server j in order for the server j to invert the signature operation. Thus, the certificate $c_i$ of terminal i now takes the form $c_i = \sqrt{h(i,P_i,N_i)} \mod N_u$ instead of $c_i = \sqrt{h(i,P_i)} \mod N_u$.

In another variation of this protocol, the third transmission of the real-time protocol (the transmission of the message $x_L$) is omitted, and instead the challenge (m) is required to have some agreed-upon pattern or "color". After decryption of the message transmitting m (using the conventional cipher with key $x_R$), party i verifies that the expected pattern is present. Party i aborts the protocol if the expected pattern is not present. This completes the authentication of the network side j by the terminal i. The remainder of the protocol executes as previously stated.

This protocol achieves full fledged public key two way authentication plus session key agreement, which is inseparable from the authentication process. All this is done at a cost of three on-line large multiplications for the computationally weak side (plus a few hundred off-line large multiplications, and potentially around 100 bytes of added memory). In comparison RSA achieves this level of security at the cost of a few hundred large on-line (real-time) multiplications on both sides. For PCS handsets, this difference is crucial. Even for ADSI terminals, that do not have problems of power or space, this is important, because the complexity of the proposed protocol is low enough to provide good real-time performance without requiring a high-performance processor such as a Digital Signal Processor or special modular exponentiation circuitry in the terminal. Such a processor, which is required for adequate real-time performance with RSA, could increase the cost of a terminal by as much as $100.

For an 8-bit micro-controller which would be expected to be present in PCS handsets and ADSI terminals, computation of a single modular multiplication takes on the order of 0.1 seconds. Analysis of this protocol shows that the handset or terminal must perform only 3 modular multiplications in real time, requiring around 0.3 seconds processing time. (Compare this with roughly 20 seconds for RSA). Processing time in the network side can be assumed negligible because the network is assumed to be computationally strong. Transmission time will add to the protocol execution time. But some messages can be combined to reduce transmission time while retaining the security of the protocol.

Note, however, that a precomputation on the order of 200 modular multiplications (20 seconds on an 8-bit micro) is required in the terminal for each execution of the protocol because the value r must change with every signature. This can be done well in advance, and the results stored for use in future transactions.

CONCLUSION

A protocol which enables session key agreement and mutual authentication between a terminal and a server has been disclosed. The protocol requires only minimal processing on one side. This makes the protocol ideal for PCS handsets, ADSI terminals, and smart cards. The protocol supports location/identity hiding which is especially important for a PCS.

Finally, the above-described embodiments of the invention are intended to be illustrative only. Numerous alternative embodiments may be devised by those skilled in the art without departing from the scope of the following claims.

We claim:

1. A method for achieving mutual identification and session key agreement between a terminal and a server at the start of communication session comprising the steps of
    (a) transmitting from the server to the terminal an identity j of the server, public key $N_j$ of the server and a certificate $C_j$ of the server which certificate $C_j$, if valid, is congruent to $\sqrt{h(j, N_j)} \mod N_u$ where $N_j$ is a public key of the server, $N_u$ is a public key of a central authority, and h() signifies a one-way hashing function,
    (b) at the terminal, verifying that said transmitted certificate $C_j$ received at the terminal satisfies $h(j, N_j) = c_j^2 \mod N_u$,
    (c) at the terminal, choosing a random number $x = (x_L, x_R)$ and obtaining $y = x^2 \mod N_j$ and transmitting y to said server,
    (d) at said server, performing the modular square root operation to obtain $x = (x_L, x_R) = \sqrt{y} \mod N$ by using secret keys of the server $p_j, q_j$, such that $N_j = p_j q_j$, and transmitting $x_L$ back to the terminal,
    (e) transmitting, from the terminal to the server, an identity i of the terminal, a public key $P_i$ of the terminal, and a certificate $c_i$ of the terminal which certificate $c_i$, if valid, is congruent to $\sqrt{h(i,P_i)} \mod N_u$, wherein the identity i, the public key $P_i$ and the certificate $c_i$ are encrypted using $x_R$ as a session key,
    (f) at the server, verifying that the received certificate $c_i$ satisfies $h(i,P_i) = C_i^2 \mod N_u$,
    (g) computing at the terminal a signature S(m) based on a challenge message m sent by the server by applying an asymmetric signature operation to said challenge message m, and transmitting the signature to the server in encrypted form using $x_R$ as a session key, and
    (h) verifying the signature at the server.

2. The method of claim 1 wherein said signature s(m) is given by the ordered pair (v,w) for which:

$$P_i^v v^w = a^m \mod N_s$$

where
    $P_i$ is said public key of the terminal, $N_s$ is a signature modulus which is a prime number or the product of two prime numbers, $\alpha$ is a generator in the maximal cyclic subgroup of the multiplicative group of integers modulo $N_s/Z^*_{ns}$.

3. The method of claim 2 wherein said step of evaluating a signature s(m) on a message m comprises performing the real time operation $$w=(m-S_iv)*r^{-1} \bmod \phi(N_s)$$

where r is a predetermined number, $v \equiv \alpha^r \bmod N_s$, $\phi(N)$ is the Euler totient function, and $\gcd(r,\phi(N))=1$.

4. The method of claim 3 wherein the value of r is chosen randomly each time the terminal evaluates a signature 5. The method of claim 3 wherein a terminal i has a separate signature modulus $N_{iS}$ and wherein the certificate of the terminal i is of the form $c_i = \sqrt{h(i,p_i, N_{iS})} \bmod N_u$.

6. The method of claim 1 wherein said signature operation is an ElGamal signature operation.

7. The method of claim 1 wherein said signature S(m) is computed according to the National Institute of Standards and Technology Digital Signature Standard Algorithm.

8. The method of claim 1 wherein said communication session is aborted if the certificate $c_j$ received at said terminal does not satisfy $c_j^2 \bmod N_u = h(j,N_j)$.

9. The method of claim 1 wherein said communication session is aborted if the certificate $c_j$ received at the server does not satisfy $c_j^2 \bmod N_u = h(i,P_i)$.

10. The method of claim 1 wherein said terminal is a terminal of a portable communications system and said server is a port control unit of said portable communication system.

11. The method of claim 10 wherein said terminal is a portable telephone.

12. The method of claim 1 wherein the terminal is a smart card and the server is a smart card base unit.

13. The method of claim 1 wherein the terminal is an Analog Display Service Interface (ADSI) terminal and said server is an ADSI network cryptoserver.

14. The method of claim 1 wherein said terminal is computationally weaker than said server.

15. The method of claim 13 wherein said initialization step further comprises selecting said secret key $s_i$ and generating the corresponding public key $p_i$, forming the certificate $c_i$ at the central authority and transmitting the certificate $c_i$ to the terminal, and transmitting the public key $N_u$ of the central authority to the terminal.

16. The method of claim 1 wherein prior to any communication session said server is initialized by selecting for the server its secret key $p_j q_j$, and its public key $N_j = p_j q_j$ transmitting the public key $N_j$ to the central authority, forming the certificate $c_j$ at the central authority and transmitting the certificate $c_j$ to the server, and transmitting said public key $N_u$ from said central authority to said server and storing the key $N_u$ at said server.

17. The method of claim 1 further comprising the step of, at the server, identifying the proper root when computing $\sqrt{y} \bmod N_j$ by providing said random number with color.

18. A method for achieving mutual authentication and session key agreement between a server and a terminal comprising the steps of (a) transmitting a certificate of said server from said server to said terminal, (b) verifying the authenticity of said certificate of said server at said terminal, (c) distributing a session key to said terminal and server by selecting a random number x at said terminal, encrypting sad umber x at said terminal by performing at said terminal an asymmetric public key operation which can only be inverted with the knowledge of a secret key of said server, (d) transmitting said number x in encrypted form from said terminal to said server and inverting said operation suing said secret key of said server to obtain x at said server, (e) transmitting a certificate of said terminal from said terminal to said server encrypted using a session key, wherein said session key is based on said number x, (f) verifying the authenticity of said terminal certificate at said server, (g) evaluating a signature S(m) of a message m at said terminal using an asymmetric signature operation, and (h) transmitting the signature to said server in encrypted form using said session key and inverting the signature operation at said server.

19. The method of claim 18 wherein said step (a) comprises transmitting from said server to said terminal an identity j of said server, a public key $N_j$ of said server and a certificate $c_j$ which if valid is of the form $c_j \equiv \sqrt{h(j,N_j)} \bmod N_u$ where $N_u$ is a public key of a central authority.

20. The method of claim 19 wherein said step (b) comprises determining if $h(j,N_j) \equiv c_j^2 \bmod N_u$.

21. The method of claim 18 wherein said asymmetric public key operation is $y \equiv c_j^2 \bmod N_j$, where $N_j$ is a public key of the server.

22. The method of claim 21 wherein $s=(x_L, x_R)$, wherein $x_R$ is said session key, and wherein x is provided with color which is used at said server to identify the proper root of $x^2 \bmod N_j$.

23. The method of claim 18 wherein said step (e) comprises transmitting an identity i of said terminal, a public key $P_i$ of said terminal and a certificate $c_i$ of said terminal which if valid is of the form $c_i \equiv \sqrt{h(i,P_i)} \bmod N_u$.

24. The method of claim 23 wherein said step (f) comprises determining if $h(i,P_i) \equiv c_i^2 \bmod N_u$.

25. The method of claim 18 wherein said signature operation is an ElGamal signature operation.

26. A method for achieving mutual authentication and session key agreement between a first party and a second party at the start of a communication session comprising the steps of (a) distributing a session key between said parties by selecting a random number at said first party, encrypting said random number using an asymmetric public key encryption operation, transmitting the encrypted random number to the second party, and inverting said encryption operation at said second party to obtain said random number, and (b) at said first party, performing an asymmetric signature operation on a message m to obtain a signature S(m), encrypting said signature S(m) using an encipherment function and a session key which is based on said random number, and transmitting the encrypted signature S(m) to said second party, and at said second party, decrypting said signature S(m) and inverting said signature operation.

27. The method of claim 26 wherein said public key encryption operation comprises squaring said random number utilizing only a single modular multiplication at said first party.

28. The method of claim 26 wherein said signature operation is an ElGamal signature operation which utilizes only a single real time modular multiplication at said first party.

29. The method of claim 26 further comprising the step of authenticating a certificate of said second party at said first party by performing only a single modular multiplication at said first party.

30. The method of claim 26 further comprising the step of authenticating a certificate of said first party at said second party.

31. The method of claim 26 wherein said second party has more computational resources than said first party.

32. The method of claim 31 wherein the terminal is an Analog Display Server Interface (ADSI) and the server is an ADSI network crypto server.

33. The method of claim 26 wherein said first party is a terminal of a portable communication system and the second party is a port control unit of the portable communication system.

34. The method of claim 26 wherein the first party is a terminal and the second party is a server.

35. The method of claim 34 wherein said terminal is a smart card and said server is a smart card base unit.

36. The method of claim 26 wherein the first party is a server and the second party is a terminal or workstation.

37. A method for achieving mutual authentication and session key agreement between first and second parties communicating via a communication medium comprising:
 (a) transmitting a certificate of said second party for said second party to said first party,
 (b) verifying the authenticity of said certificate of said second party at said first party,
 (c) distributing a session key to said first and second parties by selecting a random number x at said first party, encrypting said number x at said first party by performing at said first party an asymmetric public key operation which can only be inverted with the knowledge of a secret key of said second party,
 (d) transmitting said number x in encrypted from said first party to said second party and inverting said operation using said secret key of said second party,
 (e) transmitting a certificate of said first party from said first party to said second party encrypted using a session key based on said number x,
 (f) verifying the authenticity of said certificate of said first party at said second party,
 (g) evaluating a signature S(m) of a message m at said first party using an asymmetric signature operation,
 (h) transmitting the signature to said second party in encrypted form using said session key and inverting the signature operation at the second party.

* * * * *